United States Patent
Bothe et al.

(10) Patent No.: US 11,855,867 B2
(45) Date of Patent: Dec. 26, 2023

(54) ENHANCED IDENTIFICATION OF SOURCES OF DELAYS IN PACKET DELIVERY ALONG A PATH

(71) Applicant: Palo Alto Networks, Inc., Santa Clara, CA (US)

(72) Inventors: John Edward Bothe, Mount Eliza (AU); Hristos Siakou, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/646,260

(22) Filed: Dec. 28, 2021

(65) Prior Publication Data

US 2023/0208734 A1 Jun. 29, 2023

(51) Int. Cl.
*H04L 43/0864* (2022.01)
*H04L 43/0829* (2022.01)
*H04L 43/087* (2022.01)
*H04L 45/00* (2022.01)
*H04L 43/0852* (2022.01)
*H04L 43/10* (2022.01)
(Continued)

(52) U.S. Cl.
CPC ........ *H04L 43/0864* (2013.01); *H04L 43/087* (2013.01); *H04L 43/0829* (2013.01); *H04L 45/20* (2013.01)

(58) Field of Classification Search
None
See application file for complete search history.

(56) References Cited

U.S. PATENT DOCUMENTS 9,985,858 B2 5/2018 Lad et al.
10,250,474 B2 4/2019 Akhter et al.
(Continued)

FOREIGN PATENT DOCUMENTS

JP 2012039565 A * 2/2012
WO 2021021267 A1 2/2021

OTHER PUBLICATIONS

Palo Alto Networks, Inc., "Autonomous Digital Experience Management (ADEM) at a Glance", Palo Alto Networks, Inc., 2021, 1 page.
(Continued)

*Primary Examiner* — John A Follansbee
*Assistant Examiner* — Kamal M Hossain
(74) *Attorney, Agent, or Firm* — Gilliam IP PLLC

(57) ABSTRACT

An initial test is executed to determine an end-to-end latency of a path between a source and a destination. Subsequent tests incrementally target each node of the path for measurement of metric values indicative of delay of the nodes (e.g., latency, jitter, and packet loss). As tests are performed incrementally for each node, the maximum observed latency is tracked and used for calculating timeout thresholds. For the first hop, the timeout threshold is determined relative to the end-to-end latency; for subsequent hops, the timeout threshold is determined relative to the maximum non-timeout latency measured for a previous hop. Each test is performed N times to obtain additional values of delay metrics for each node. Upon completion of the N passes through the path, the resulting delay metric values determined for each test set are aggregated to yield a single, comprehensive result set.

20 Claims, 8 Drawing Sheets

(51) Int. Cl.
   *H04L 43/106* (2022.01)
   *H04L 43/50* (2022.01)

(56) References Cited

U.S. PATENT DOCUMENTS

| | | | |
|---|---|---|---|
| 10,986,009 B2 | 4/2021 | Lad et al. | |
| 11,153,190 B1* | 10/2021 | Mahajan | H04L 67/148 |
| 2005/0286416 A1* | 12/2005 | Shimonishi | H04L 47/2416 |
| | | | 370/229 |
| 2007/0268911 A1* | 11/2007 | Alve | H04L 63/107 |
| | | | 370/395.52 |
| 2016/0359592 A1* | 12/2016 | Kulshreshtha | G06F 3/0482 |
| 2020/0145313 A1* | 5/2020 | Raindel | H04L 41/30 |
| 2022/0231937 A1* | 7/2022 | Liu | H04L 45/24 |

OTHER PUBLICATIONS

Thousandeyes, "Network Tests Explained", ThousandEyes Documentation, retrieved on Oct. 1, 2021 from https://docs.thousandeyes.com/product-documentation/internet-and-wan-monitoring/tests/network-tests/network-tests-explained, 2021, 11 pages.

* cited by examiner

ENHANCED IDENTIFICATION OF SOURCES OF DELAYS IN PACKET DELIVERY ALONG A PATH

BACKGROUND

The disclosure generally relates to transmission of digital information and to arrangements for monitoring or testing packet switching networks.

Network path tracing techniques are implemented to trace the path taken by a packet from its source to its destination to allow for identification of intermediate network elements (e.g., routers). The traceroute and tracert commands are commonly executed to trace a path of a Transmission Control Protocol (TCP) or User Datagram Protocol (UDP) packet from a source device to a target Internet Protocol (IP) address or hostname. The implementation of TCP traceroute, for example, sends a series of TCP packets targeting the destination address with an incrementing time to live (TTL) value such that latencies of each hop can be measured until the destination address is reached. Results of tracing a path such as with traceroute/tracert indicate the IP addresses of each of the network elements, also referred to as "nodes," traversed along the path from the source to the destination as well as the latencies/delays of each hop. Network path traces are often employed for network diagnostics operations to determine the source of delays in packet delivery.

BRIEF DESCRIPTION OF THE DRAWINGS

Aspects of the disclosure may be better understood by referencing the accompanying drawings.

DESCRIPTION

Figure 1:
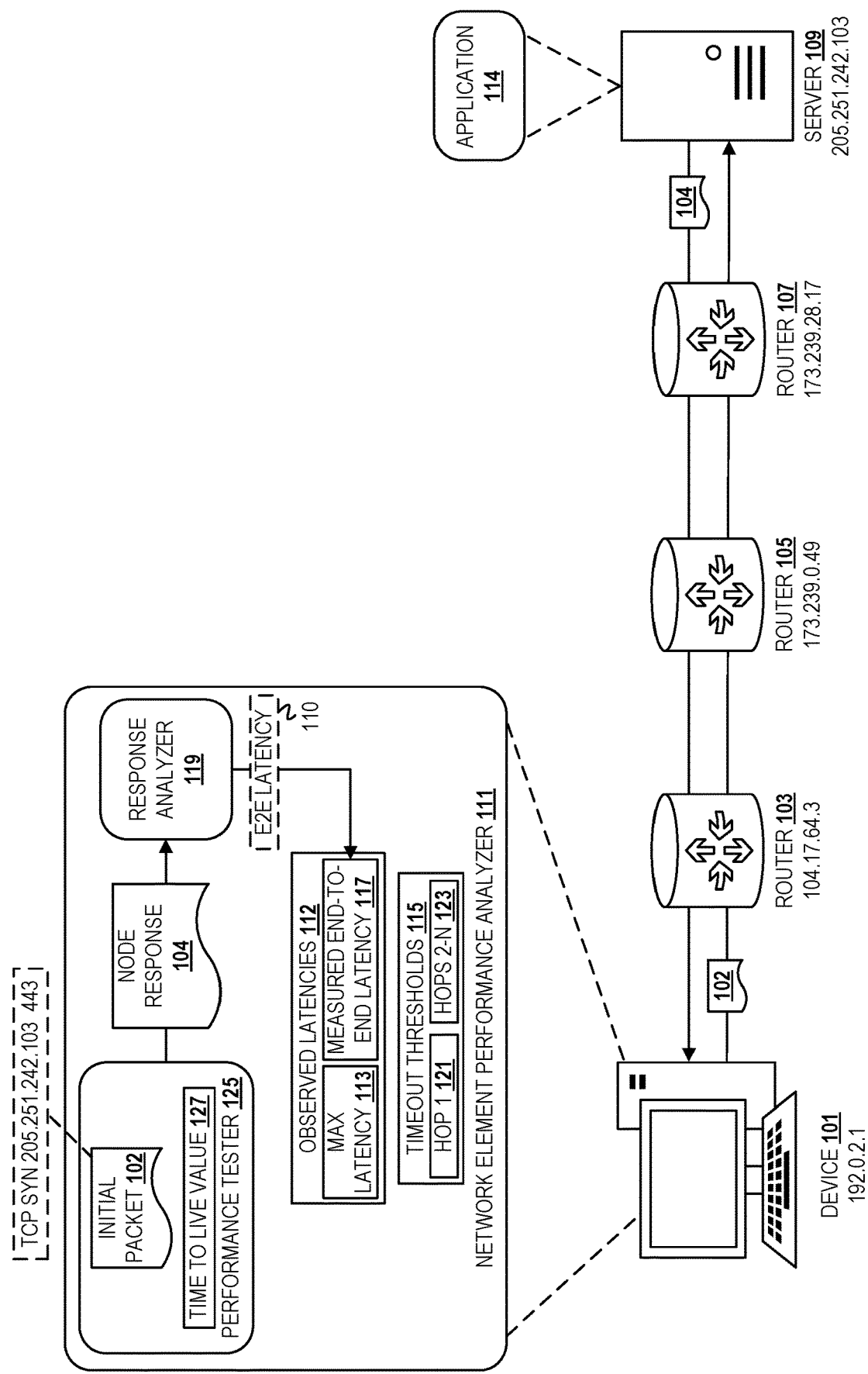
FIG. 1 depicts a conceptual diagram of determining an end-to-end latency for a path between source and destination IP addresses that influences subsequent performance tests targeting individual nodes along the path.

The description that follows includes example systems, methods, techniques, and program flows that embody aspects of the disclosure. However, it is understood that this disclosure may be practiced without these specific details. For instance, this disclosure refers to sending TCP SYN packets as part of determining node IP addresses and their latencies in illustrative examples. Aspects of this disclosure can be instead applied to other packet types that include a TTL field, such as UDP or Internet Control Message Protocol (ICMP) echo request packets. In other instances, well-known instruction instances, protocols, structures and techniques have not been shown in detail in order not to obfuscate the description.

Overview

Conventional path tracing and analysis techniques can provide an estimate of delays in packet delivery along a path between source and destination IP addresses. However, these techniques do not resolve the challenge of accurately pinpointing the network element(s) that is responsible for substantial delay. To resolve these shortcomings, techniques for rapid and accurate identification of network elements causing delays in packet delivery for enhanced network diagnostics and remediation are disclosed herein. An initial test is executed to determine the end-to-end latency for packets traveling between a source IP address and destination IP address. Subsequent tests are then performed incrementally for each node of the path to identify the network elements of which the path is comprised and determine values of metrics indicative of delay for each hop (e.g., latency). As tests are performed incrementally for each node along the path, the maximum observed latency is tracked and used for calculating timeout thresholds. For the first node, the timeout threshold can be determined relative to the end-to-end latency; for subsequent nodes, the timeout threshold is determined relative to the maximum valid latency measured for a previous node, where a valid latency is one that did not exceed the timeout threshold for the corresponding node. The maximum latency and corresponding timeout threshold can be updated based on results of each test. To account for outliers in latencies or timeouts of network elements caused by inherent variability in responsiveness rather than true performance issues, multiple passes through the nodes along the path are made when performing the tests to obtain a corresponding number of latency measurements for each node. The latencies are aggregated for each node upon completion of each pass with the corresponding jitter and cumulative packet loss also determined. Aggregating the latencies across tests and determining jitter and packet loss from multiple repetitions of the tests yields a single, comprehensive result set that is of higher accuracy than would result from performing the set of tests just once. The node(s) causing delays in packet delivery can thus be identified from the combined result set with greater confidence due to the repeated, incremental tests along hops with dynamically adjusted timeout thresholds.

Example Illustrations

FIG. 1 depicts a conceptual diagram of determining an end-to-end latency for a path between source and destination IP addresses that influences subsequent performance tests targeting individual nodes along the path. In this example, a device 101 with IP address 192.0.2.1 accesses an application 114 hosted on a server 109 with IP address 205.251.242.103. The server 109 may be a hardware server or a cloud server (e.g., if the application 114 is a web application or a cloud-delivered application, respectively). A network element performance analyzer ("performance analyzer") 111 executes on the device 101 and includes a performance tester 125 and a response analyzer 119. The performance analyzer 111 identifies performance issues of nodes traversed by network traffic between a source and destination that cause delays. The performance analyzer 111 executing on the device 101 analyzes performance of nodes traversed by network traffic that corresponds to access of the application 114. The performance analyzer 111 can execute on an agent installed on the device 101. While not depicted in FIG. 1 for clarity, a plurality of agents on which a respective instance of the performance analyzer 111 executes may be deployed to a corresponding plurality of devices and may communicate with a central service that manages agent deployment (e.g., a cloud-based service or service hosted on another server). In this example, the route of network traffic sent to and from the device 101 and the server 109 for accessing the application hosted on the server 109 encompasses a router 103 with IP address 103.17.64.3, a router 105 with IP address 172.239.0.49, and a router 107 with IP address 173.239.28.17.

The performance tester 125 sends an initial packet 102 to the server 109 to determine the end-to-end latency for the route between the device 101 and the server 109. The initial packet 102 comprises a TCP synchronize (SYN) packet targeting the server 109 on port 443 in this example. The performance tester 125 may execute a script to result in sending of the initial packet 102. The performance tester 125 maintains a TTL value 127 that indicates a value of the TTL field to be included in sent TCP SYN packets. The TTL value 127 may be initialized with a default value sufficiently large to ensure delivery to the server 109 (e.g., 255). The TTL field of the initial packet 102 sent to the server 109 should indicate the default TTL with which the TTL value 127 was initialized. As depicted in FIG. 1, the initial packet 102 sent from the device 101 traverses each hop along the route to the server 109, or the router 103, the router 105, the router 107, before reaching the server 109. The initial packet 102 is expected to elicit a response from the server 109 since a lack of response would be indicative of issues experienced by the server 109 and/or the application 114. Thus, remaining operations assume the server 109 responds to the initial packet 102.

The performance analyzer 111 obtains a response 104 from the server 109. The response 104 may be a TCP SYN acknowledgement (SYN-ACK) packet sent by the server 109 in acknowledgement of the initial packet 102 that was a TCP SYN packet. The response analyzer 119 determines an end-to-end latency 110 of the route from the device 101 to the server 109 based on the response 104. The response analyzer 119 can determine the end-to-end latency 110 by determining a time between sending the initial packet 102 and receipt of the response 104. Since this time will be the round trip time for communications between the device 101 and server 109, the performance analyzer 111 can determine the end-to-end latency 110 as half of the round trip time. The response analyzer 119 updates a measured end-to-end latency 117 maintained by the performance analyzer 111 in a set of observed latencies 112 (e.g., stored in a data structure) with the end-to-end latency 110. The response analyzer 119 may also associate an indication of the server 109 (i.e., its IP address) to which the end-to-end latency corresponds with the measured end-to-end latency 117. For instance, the observed latencies 112 maintained by the performance analyzer 111 can include a plurality of measured end-to-end latencies for different routes being tested and can also indicate the destination IP address associated with each measured latency to facilitate distinguishing between latencies. In this case, the observed latencies 112 can comprise a single data structure in which end-to-end latencies are accessible based on corresponding destination IP address or multiple data structures that each correspond to a respective destination IP address.

While FIG. 1 depicts the initial packet 102 as a single packet, a plurality of packets can instead be sent to the server 109. In this case, the server 109 will send a plurality of corresponding responses from which the response analyzer 119 can determine respective end-to-end latencies as similarly described for the single packet case. For instance, the performance analyzer 111 can send a plurality of TCP SYN packets to the server and receive a plurality of TCP SYN-ACK packets in response. The response analyzer 119 then aggregates (e.g., averages) the end-to-end latencies corresponding to each packet to determine the latency to store as the measured end-to-end latency 117.

FIG. 1 also depicts timeout thresholds 115 that are initialized based on the measured end-to-end latency 117. The timeout thresholds 115 comprise a threshold 121 for a latency of the network element corresponding to the first hop along a route and a threshold 123 for latencies of subsequent hops (i.e., hops 2 through N on a route with N hops). Each of the thresholds 121, 123 can correspond to a value that is determined based on one of the latencies stored in the observed latencies 112 for the associated route. The threshold 121 against which latencies of the first network element along a route are evaluated can be a value that is relative to the measured end-to-end latency 117 (e.g., a fraction, percentage, or proportion of the measured end-to-end latency 117). The threshold 123 against which latencies of subsequent nodes along the route are evaluated can be a value that is relative to a maximum latency 113 recorded for the route. As an example, the threshold 121 may be represented as 75% of the measured end-to-end latency 117, and the threshold 123 may be represented as 150% of the maximum latency 113. The threshold 121 and/or threshold 123 may also comprise a minimum value of the enforceable threshold in the event of routes with lower end-to-end latencies that may result in multiple undesired timeouts. Returning to the previous example, the threshold 121 may be represented as the maximum of 75% of the measured end-to-end latency 117 and 100 milliseconds (or another configurable value), and the threshold 123 may be represented as the maximum of 150% of the maximum latency 113 and the measured end-to-end latency 117. The flexibility of representing the thresholds 121, 123 in terms of previously-observed latencies caters the evaluation of node performances to the route itself for increased accuracy in identification of outliers and/or performance issues. Utilization of the thresholds 121, 123 is now described in reference to FIG. 2.

Figure 2:
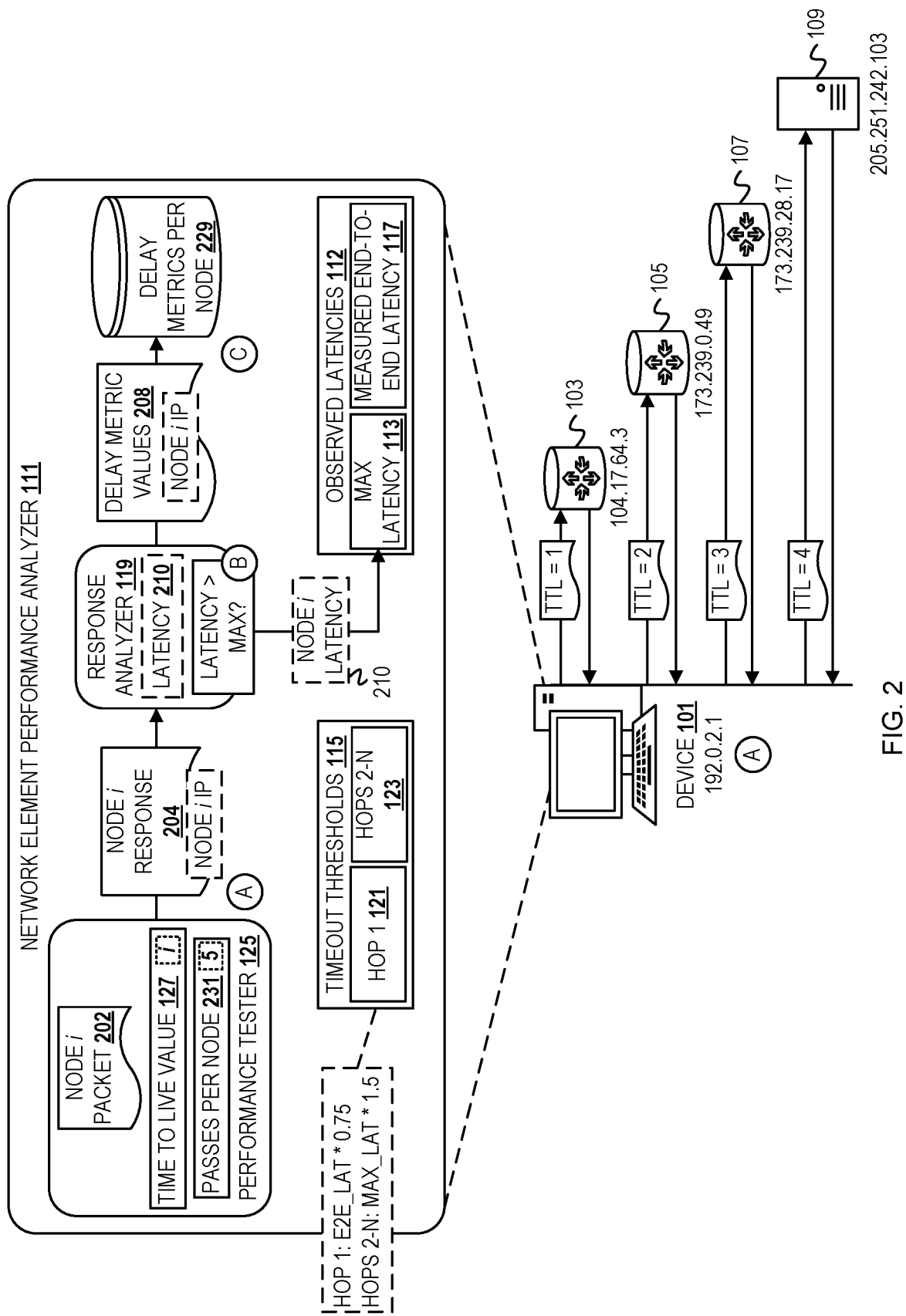
FIG. 2 is a conceptual diagram of incremental execution of performance tests for each node of a path and adjustment of evaluation criteria for subsequent tests based on the test results.

FIG. 2 is a conceptual diagram of incremental execution of performance tests for each node of a path and adjustment of evaluation criteria for subsequent tests based on the test results. The operations depicted in and described in reference to FIG. 2 are performed by the performance analyzer 111 after the end-to-end latency of the path from source IP address to destination IP address under analysis has been determined. The TTL value 127 maintained by the performance tester 125 is initialized to one at the beginning of incremental performance testing for incrementation after testing each node.

FIG. 2 is annotated with a series of letters A-C. These letters represent stages of operations. The stages of operations are performed for each node on the path for which the end-to-end latency was determined as described in reference to FIG. 1. For instance, referring to this example, the operations represented by stages A-C are performed for the router 103, then for the router 105, and finally for the router 107. The node for which the operations are being performed at each stage is referred to as "the current node." Additionally, although these stages are ordered for this example, the stages illustrate one example to aid in understanding this disclosure and should not be used to limit the claims. Subject matter falling within the scope of the claims can vary with respect to the order and some of the operations.

FIG. 2 also depicts the performance tester 125 as maintaining a value 231 of passes per node, which is five in this example. The performance analyzer 111 can complete multiple passes through the nodes of the path when testing performance and analyzing latencies, where the number of passes is given by the value 231. The operations represented by stages A-C are thus performed for each node on the path a number of times that corresponds to the value 231 of passes per node. The value 231 may be a setting of the performance tester 125 with which it was configured or may have been provided to the performance tester 125 as a parameter value (e.g., with a submitted request to test performance for a path). Completing multiple passes through the nodes increases accuracy in results by allowing for the performance analyzer 111 to account for outliers and expected variations in node performance across passes. As an example, on the first pass, the test results for the router 105 may indicate a timeout so that no valid latency was recorded. On subsequent passes, the test results for the router 105 may then indicate valid (i.e., non-timeout) latencies due the timeout being a true outlier in performance of the router. This increases accuracy and confidence in the final results by ensuring that outliers are treated as such rather than actual performance issues of a node.

At stage A, the performance tester 125 determines a latency of the current node. The performance tester 125 sends a packet 202 to the current node. Like the initial packet 102 of FIG. 1, the packet 202 can be a TCP SYN packet having a destination address corresponding to the server 109 and targeting a certain port (e.g., port 80 or 443). The performance tester 125 may execute a script to send the TCP SYN packet. The value of the TTL field of the packet 202 is the TTL value 127 maintained by the performance tester. Since the TTL value 127 was initialized to one and is incremented after each performance test targeting a node of the path, the packet 202 is dropped upon reaching a node having a hop count along the path that corresponds to the TTL value 127. To illustrate, the TTL field of the packet 202 will include a value of 1 for testing that targets the router 103, a value of 2 for testing that targets the router 105, etc. Additionally, while depicted as sending a single packet in FIG. 2, the performance tester 125 may send multiple packets that each include the TTL value 127 in the respective TTL fields.

Once the packet 202 reaches the current node, which is the node on the path having a hop count corresponding to the TTL value 127, the packet 202 is dropped, and a response 204 is sent to the performance tester 125. The response 204 may be an error message indicating that the TTL of the packet 202 has expired. For instance, the response 204 may be an ICMP time exceeded message. If multiple packets were sent, the performance tester can receive multiple responses sent from the current node that comprise a corresponding number of ICMP time exceeded messages. If a response is not received after an elapsed time that exceeds the respective one of the timeout thresholds 115, the performance tester 125 can send another packet with the TTL value 127 to target the current node.

At stage B, the response analyzer 119 determines a latency 210 for the current node and its IP address based on receipt of the response 204 and evaluates the latency to determine whether to record the latency for the current node. The response analyzer 119 determines the IP address of the current node based on the IP address of the sender of the response 204. The response analyzer 119 can determine a latency 210 of the current node upon receipt of the response 204 based on a time between sending of the packet 202 and receipt of the response 204. For example, as described above, the response analyzer 119 can take half of the difference between the times recorded for sending the packet 202 and receiving the response 204 in determining the latency 210. If multiple packets were sent and corresponding responses received, the response analyzer 119 can determine the respective latencies from those of the responses that did not indicate a connection timeout and aggregate the determined latencies to generate the latency 210 as similarly described in reference to FIG. 1.

The response analyzer 119 then determines whether the latency 210 should be recorded for the current node for subsequent consideration in aggregation and analysis of delay metric values of the node. Determination of whether latencies should be recorded for a node is based on evaluation of the latency 210 against a corresponding one of the timeout thresholds 115 to determine whether the latency 210 exceeds the timeout threshold. If the current node is the first hop on the path (i.e., the router 103), the response analyzer 119 evaluates the latency 210 against the threshold 121. If the current node is any subsequent node (i.e., one of the routers 105, 107), the response analyzer 119 evaluates the latency 210 against the threshold 123. The response analyzer 119 can determine the threshold against which the latency 210 should be evaluated based on the TTL value 127, which is indicative of the hop count of the current node.

As described above, the thresholds 121, 123 are values relative to the maximum latency 113. In this example, the threshold 121 is defined as 75% of the maximum latency 113 and the threshold 123 as 150% of the maximum latency 113, though other values relative to the respective one of the observed latencies 112 are possible. The response analyzer 119 evaluates the latency 210 against the corresponding threshold. If the latency 210 exceeds the corresponding one of the thresholds 121, 123, the response analyzer 119 can determine that the latency 210 should not be recorded for the current node. Determining that the latency 210 should not be recorded includes associating a label, flag, tag, etc. with the latency 210 indicating that the latency 210 corresponds to a timeout, discarding the latency 210, replacing the latency 210 value with an indicator used for timeout values or a null value, etc. If the latency 210 is below the corresponding one of the thresholds 121, 123, the response analyzer 119 determines that the latency 210 should be recorded for the node through insertion into a repository 229 of delay metric values per node. The repository 229 may be indexed by node IP address.

If the current node is the second or subsequent hop on the path and the latency 210 is below the threshold 123, the response analyzer 119 also compares the latency 210 to the maximum latency 113 currently stored in the timeout thresholds 115. If the latency 210 is greater than the maximum latency 113, the response analyzer 119 updates the maximum latency 113 with the latency 210. As a result of updating the maximum latency 113 with the latency 210, the threshold 123 against which subsequent latencies are evaluated will be based on the latency 210 until it is exceeded by another valid (i.e., non-timeout) latency and replaced. The response analyzer 119 may omit the comparison against the maximum latency 113 if the current node is the last hop on the route since there will be no subsequent latency determined for evaluation against the threshold 123.

At stage C, the response analyzer 119 stores delay metric values 208 recorded for the current node in association with its IP address in the repository 229. The delay metric values 208 at least include the latency 210 if it was not a timeout or an indication that the current node corresponded to a timeout. If the latency 210 is an aggregate latency and thus entailed the sending/receiving of multiple packets, the delay metric values 208 may also include packet loss determined by the response analyzer 119 based on a count of total packets sent and a count of packets associated with a latency that did not satisfy the respective one of the timeout thresholds 115. The packet loss may be represented as a fraction. To illustrate, if the performance tester 125 initiated sending of three TCP SYN packets to the current node, and one packet resulted in computation of a latency that exceeded the corresponding one of the timeout thresholds 115, the results analyzer would record a packet loss for the current node of ⅓.

Figure 3:
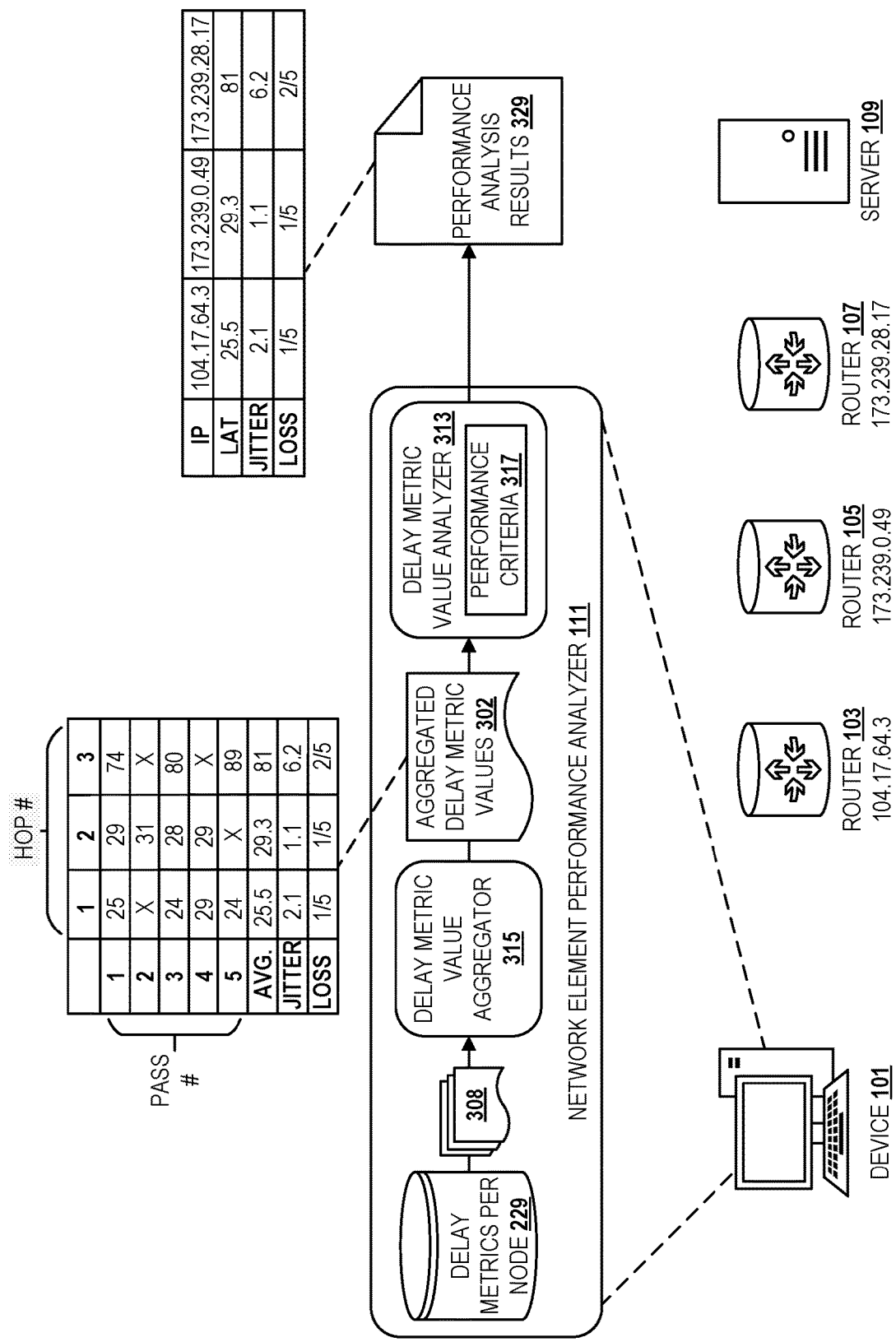
FIG. 3 is a conceptual diagram of determining values of metrics indicating delay in packet delivery per node along a path based on incremental performance testing of the nodes.

FIG. 3 is a conceptual diagram of determining values of metrics indicating delay in packet delivery per node along a path based on incremental performance testing of the nodes. FIG. 3 depicts operations of the performance analyzer 111 after completing a plurality of passes through nodes of a path for performance testing as described in reference to FIG. 2. The repository 229 maintains delay metric values determined for each pass in association with each node IP address of the path. Values of delay metrics stored in the repository 229 for each node IP address at least include latencies corresponding each of the plurality of passes. To illustrate, referring again to the example of FIG. 2 in which the performance analyzer 111 completed five passes through the nodes, each of the node IP address will be associated with a total of five latencies/indications of any timeouts. If multiple packets were sent to nodes as part of latency determination and aggregation for each node, the delay metric values can also indicate packet loss per node.

A delay metric value aggregator ("aggregator") 315 retrieves metric values 308 for each of the nodes along the route from the repository 229. The aggregator 315 may query the repository 229 with the IP addresses determined for each of the nodes (i.e., the routers 103, 105, 107) to retrieve the delay metric values recorded for each pass. The aggregator 315 then aggregates the metric values corresponding to each node to generate aggregated delay metric values ("aggregated values") 302. Aggregating the metric values 308 for a node can include computing an average latency from the recorded latency values across passes. The average latency may be computed from the non-timeout latencies with the timeouts ignored and excluded from the sample size as not to skew the average with outlier behavior by the node. For instance, as depicted in FIG. 3, the latencies recorded for the router 103 are 25, 24, 29, and 24 milliseconds, with the router 103 producing a timeout during the second pass. The aggregator 315 determines the average of these four latencies with a sample size of four rather than five as 25.5 milliseconds. As part of aggregating the metric values 308 per node, the aggregator 315 can also determine jitter and packet loss based on the recorded latencies and include the jitter and packet loss in the aggregated values 302. The aggregator 315 measures jitter of a node as the standard deviation of the non-timeout latencies recorded for a node across passes. The aggregator 315 can represent packet loss as a count of packets associated with a timeout relative to total packets (i.e., as a fraction). Packet loss may be represented as a fraction, ratio, etc. rather than a percent due to the small sample size. The average latency, jitter, and packet loss determined by the aggregator 315 for each node based on the metric values 308 are indicated in the aggregated values 302 in association with the corresponding node IP addresses.

In some implementations, a delay metric value analyzer 313 of the performance analyzer 111 can also analyze the aggregate values 302 based on performance criteria 317 prior to reporting of the aggregate values 302. Evaluation of the aggregate values 302 based on the performance criteria 317 facilitates identification of nodes that are potentially experiencing issues that impact performance. The performance criteria 317 can indicate at least a first criterion for each aggregate metric value type such as a threshold that, if not satisfied by an aggregate value corresponding to a node, should result in flagging the node as potentially causing performance issues and suggesting further investigation of the node for remediation. For instance, the performance criteria 317 may indicate that a node should be flagged if it is associated with a jitter exceeding a first threshold or a packet loss relative to total packets exceeding a second threshold. The performance analyzer 111 then indicates performance analysis results 329 that at least indicate the aggregate values 302 and corresponding node IP addresses. The performance analysis results 239 can also indicate nodes associated with any performance metrics not satisfying the performance criteria 317. Indicating the performance analysis results 329 can include generating a report, notification, etc. that includes the performance analysis results 329. The performance analysis results 329 can then be used for identifying the specific nodes (if any) that are experiencing performance issues and introducing excessive delays in packet delivery for subsequent remediation thereof.

FIGS. 4-7 are flowcharts of example operations for enhanced identification of sources of delays in packet delivery along a path between source and destination IP addresses. The example operations are described with reference to a network element performance analyzer (hereinafter "the performance analyzer") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
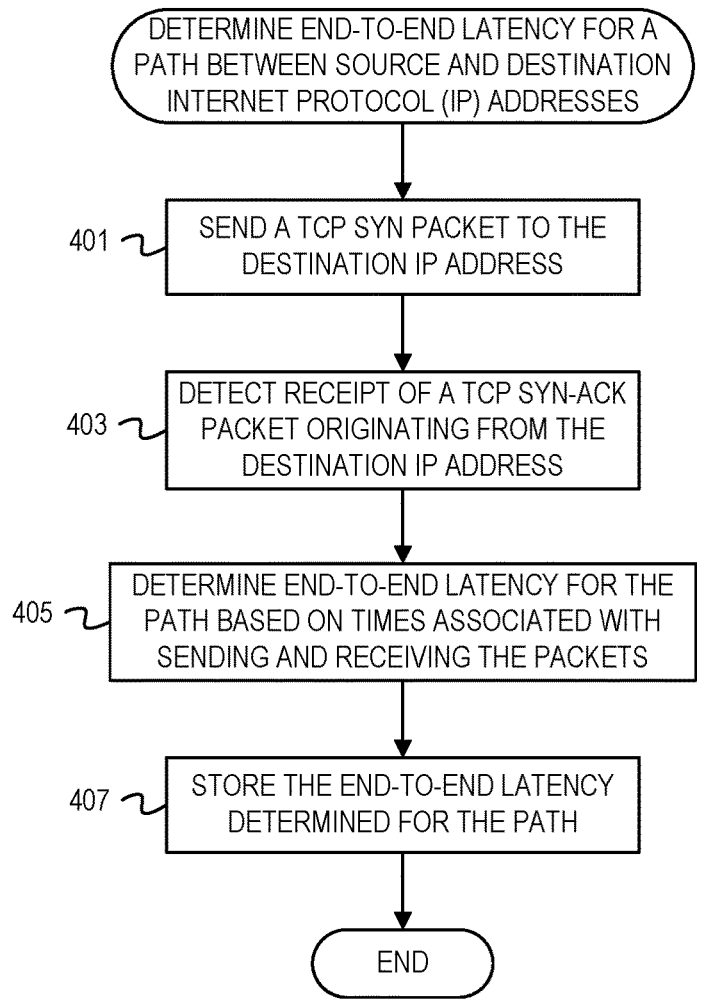
FIG. 4 is a flowchart of example operations for determining an end-to-end latency for a path between source and destination IP addresses.

FIG. 4 is a flowchart of example operations for determining an end-to-end latency for a path between source and destination IP addresses. End-to-end latency determination may be initiated based on receipt by the performance analyzer of a command/request to complete a performance analysis for a path to a destination server or may be performed according to a schedule.

At block 401, the performance analyzer sends at least a first TCP SYN packet to the destination IP address. The TCP SYN packet indicates an IP address of the destination server on a particular port that may correspond to a communication protocol used by the destination server (e.g., 80 or 443 for Hypertext Transfer Protocol (HTTP) and Hypertext Transfer Protocol Secure (HTTPS), respectively). The performance analyzer records a timestamp associated with the sending of the TCP SYN packet. If multiple TCP SYN packets are sent, the performance analyzer records the times associated with each packet. The performance analyzer may distinguish between times based on recording sequence numbers included in the TCP segment headers of the TCP SYN packets.

At block 403, the performance analyzer detects receipt of a TCP SYN-ACK packet originating from the destination IP address. The performance analyzer also records a timestamp associated with receipt of the response. If multiple TCP SYN packets were sent, the performance analyzer records the times for each corresponding TCP SYN-ACK response.

At block 405, the performance analyzer determines an end-to-end latency for the path based on times associated with sending and receiving the TCP SYN and SYN-ACK packets, respectively. The performance analyzer can determine the end-to-end latency as half of the difference between the time associated with sending the TCP SYN packet and receiving the TCP SYN-ACK packet. If multiple TCP SYN and TCP SYN-ACK pairings were timed, the performance analyzer can determine the end-to-end latencies for each pair and average the latencies to determine a single end-to-end latency.

At block 407, the performance analyzer stores the end-to-end latency determined for the path. The end-to-end latency may be stored with an identifier or other indication of the path, such as with the destination IP address at the end of the path.

Figure 5:
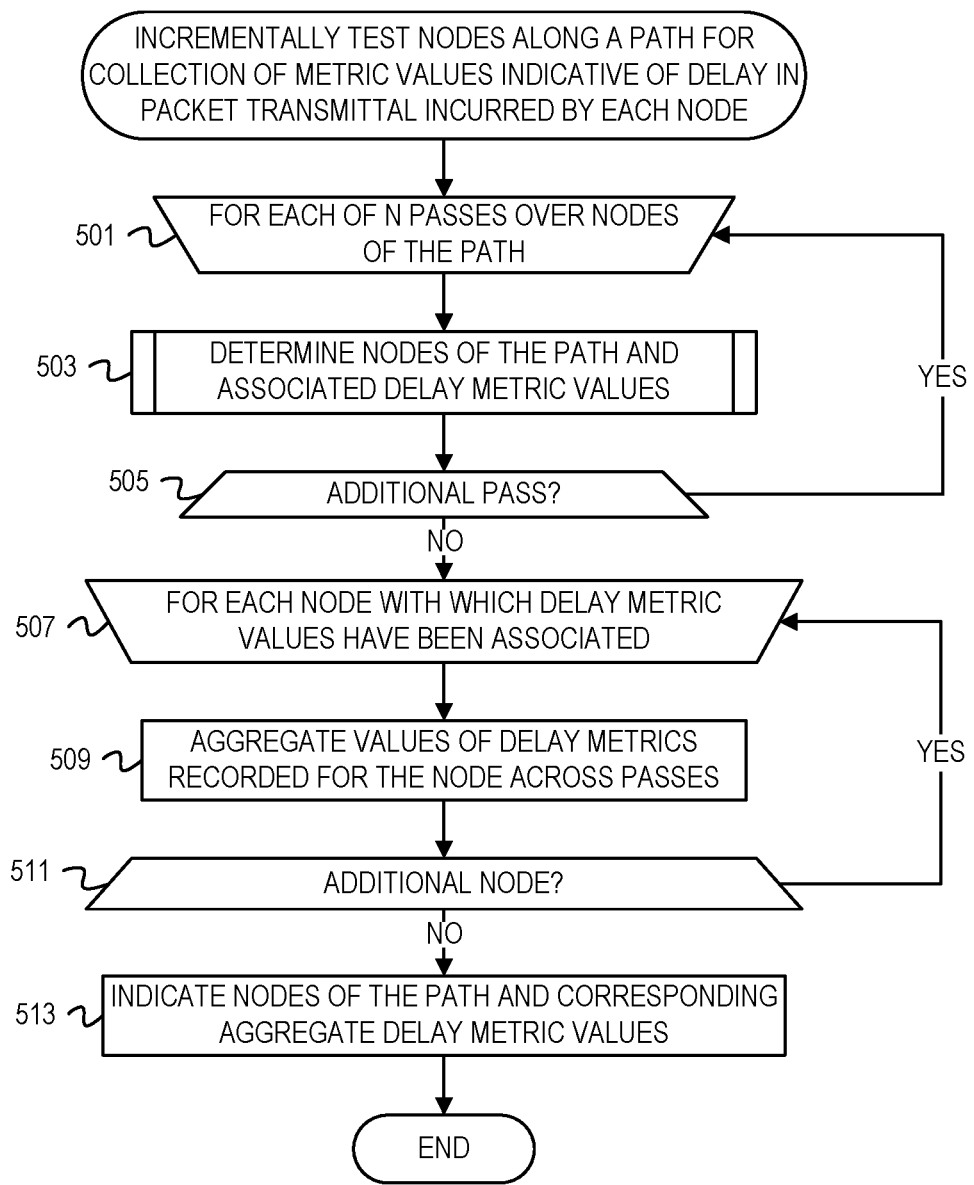
FIG. 5 is a flowchart of example operations for incrementally testing nodes along a path for collection of metric values indicative of delay in packet transmittal incurred by each node.

FIG. 5 is a flowchart of example operations for incrementally testing nodes along a path for collection of metric values indicative of delay in packet transmittal incurred by each node. The example operations assume that the end-to-end latency of the path has already been determined as described in reference to FIG. 4.

At block 501, the performance analyzer begins iterating through each of N passes over the nodes of the path. The number of passes N may be a setting of the performance analyzer with which it was configured or provided as a parameter value in a request/command to initiate performance testing. The number of passes N indicates the total number of tests to be performed for each node for collection of metric values indicative of delay (e.g., latency, jitter, and packet loss). As an example, for a value of N=5 passes, the performance analyzer will perform five tests in total for each of the nodes and collect five of each type of delay metric value. The example operations depict the performance analyzer as executing the tests hop-by-hop until delay metric values have been collected for each node and repeating the hop-by-hop testing until passing through the nodes a total of N times; that is, on each pass, testing is completed for each node of the path before beginning the next pass. In other implementations, the performance analyzer may instead execute the tests for each pass in parallel or concurrently.

At block 503, the performance analyzer determines nodes of the path and the associated delay metric values. The performance analyzer determines IP addresses of the nodes along the path and the associated delay metric values based on incremental testing of nodes until the destination IP address is reached. The performance analyzer initializes a TTL value to one, sends a TCP SYN message(s) destined for the destination server that indicates the TTL value, determines a latency and any other values of delay metrics for the node IP address indicated in a response(s) to the TCP SYN message(s) (generally an ICMP time exceeded message), increments the TTL value, and repeats until a TCP SYN-ACK message is received from the destination IP address, which indicates that each node on the path has been tested. The incrementing TTL value allows the performance analyzer to target each node on the path in hop order since packets will expire at the receiving node when the TTL value is one, thus triggering the node to send a response to the performance analyzer based on which the node IP address and latency can be determined. The performance analyzer may store the determined node IP addresses and the corresponding metric values recorded across passes in one or more data structures, such as a data structure per node IP address in which its delay metric values for each pass are stored. Determination of IP addresses of nodes of a path and corresponding delay metric values is described in further detail in reference to FIG. 6.

At block 505, the performance analyzer determines if an additional pass through the nodes of the path remains (i.e., if the number of completed passes is less than N). If there is an additional pass(es) remaining to complete N passes, operations continue at block 501. Otherwise, operations continue at block 507, where the performance analyzer begins iterating over each node with which delay metric values have been associated.

At block 509, the performance analyzer aggregates the values of delay metrics recorded for the node across passes. Aggregating the values of delay metrics at least includes aggregating (e.g., averaging) the latencies recorded for the node for each of the passes through the path. If any timeouts were recorded for the node, such as based on the absence of a latency value or any of the latency values being flagged or otherwise indicated as timeouts, the performance analyzer can discard/omit the pass(es) associated with the timeout(s) from the aggregate latency calculation. As an example, if the performance analyzer completed five passes and collected four non-timeout latencies for the node, the average latency will be determined for the four non-timeout latencies and for a sample size of four. The performance analyzer can also determine jitter and/or packet loss across the five passes as part of aggregating the delay metric values. Packet loss may be represented as a total fraction, ratio, etc. of packets (e.g., the TCP SYN messages) which yielded a timeout rather than a valid latency with respect to total packets sent.

At block 511, the performance analyzer determines if there is an additional node for which delay metric values were collected. If there is an additional node (i.e., the node is not the last hop), operations continue at block 507. Otherwise, operations continue at block 513.

At block 513, the performance analyzer indicates the nodes of the path and corresponding aggregate delay metric values determined for each node. The performance analyzer can generate a report, notification, etc. that indicates the IP addresses of each node in hop order and the corresponding aggregate latency, jitter, and/or packet loss. The indication of nodes and aggregate delay metric values may include the results from each pass with the aggregate delay metric values or may omit the results per pass.

Figure 6:
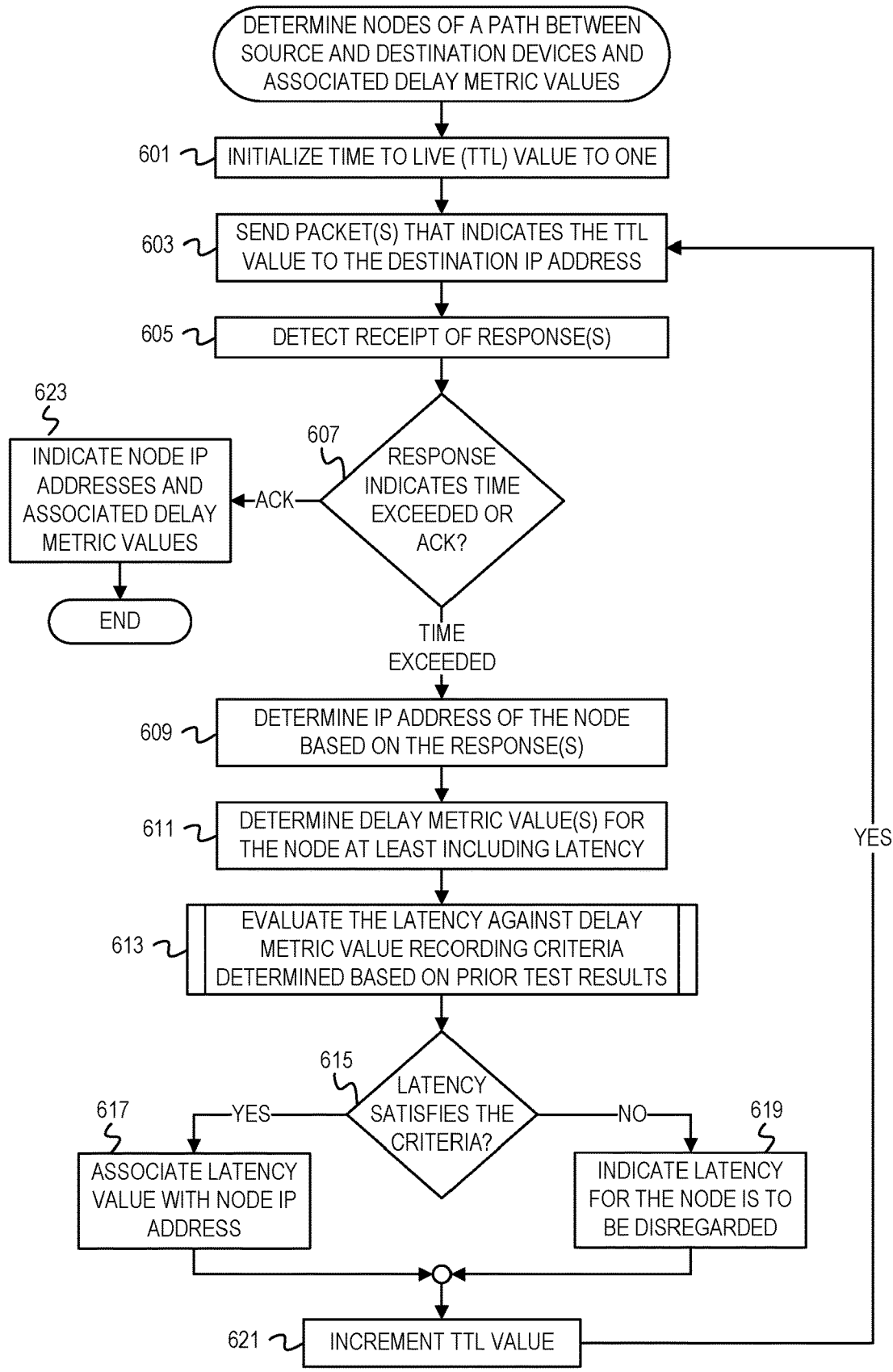
FIG. 6 is a flowchart of example operations for determining nodes of a path between source and destination devices and the associated delay metric values.

FIG. 6 is a flowchart of example operations for determining nodes of a path between source and destination devices and the associated delay metric values. The source device refers to the device on which the performance analyzer executes, and the destination device refers to a destination server, which may be an endpoint device and a web/cloud server, respectively. The example operations can implement the determination of nodes of a path and associated delay metric values depicted as block 503 in FIG. 5. The example operations also assume that an end-to-end latency has been determined for the path as described in reference to FIG. 4.

At block 601, the performance analyzer initializes a TTL value to one. The TTL value corresponds to the hop count of the node along the path that is currently being targeted for determination of delay metric values. To illustrate, the first node on the path (i.e., the first hop) will be targeted by testing performed when the TTL value is one.

At block 603, the performance analyzer sends to the destination IP address at least one packet that includes the TTL value in the TTL field. The packet is considered to target the node having the hop count corresponding to the TTL value despite the destination IP address being that of the destination server since the packet will expire at the node receiving the packet when the TTL value of is equivalent to one. The packet(s) sent by the performance analyzer can be TCP SYN packets, or TCP segments having the SYN flag of the TCP segment header set to 1. The TCP SYN packet(s) can target the destination IP address on a port according to a protocol used by the destination server corresponding to the destination IP address or another port on which the destination server listens for incoming connections. The performance analyzer may maintain associations or mappings between destinations (e.g., based on destination server IP addresses) and corresponding port numbers with which it was configured.

At block 605, the performance analyzer detects receipt of a response corresponding to each sent packet. If the packet(s) expired in transit to the destination server due to the TTL value being equivalent to one upon receipt by an intermediate node (e.g., a router along the path), whether based on the TTL value being one at the time of packet sending or based on the TTL value being decremented by other intermediate nodes when the packet was in transit, the response can be an ICMP time exceeded message that indicates an IP address of an intermediate node. Alternatively, the response can be a TCP SYN-ACK sent from the destination server if the packet reached the destination server without the TTL value being decremented to one in transit.

At block 607, the performance analyzer determines whether the response(s) indicates the time was exceeded of the packet(s) or indicates an acknowledgement of the packet(s), such as whether the response(s) is an ICMP time exceeded message or a TCP SYN-ACK message, respectively. Each of the responses should be of a same type if multiple TCP SYN packets were sent. If the response indicates time exceeded, operations continue at block 609. If the response indicates an acknowledgement of the sent packet, operations continue at block 623.

At block 609, the performance analyzer determines the IP address of the node based on the response(s). Responses will indicate the IP address of the node as the source IP address in the IP header. The performance analyzer can add the IP address to a data structure in which node IP addresses are stored in hop order (i.e., increasing indices correspond to increasing hop counts).

At block 611, the performance analyzer determines delay metric values for the node that at least includes latency of the node. The performance analyzer determines the latency based on a difference between the times of sending the packet at block 603 and receiving the response at block 605. If multiple packets were sent and corresponding responses received, the performance analyzer can determine the latency for each packet-response pair and aggregate the latencies (e.g., by averaging the latencies), and the aggregate latency is used as the determined latency of the node.

At block 613, the performance analyzer evaluates the latency against criteria for recording delay metric values for nodes, where the criteria are determined based on prior test results (e.g., previously recorded latencies). The performance analyzer maintains at least a first threshold against which the latency of the node corresponding to the first hop on the path is evaluated and a second threshold against which latencies of subsequent nodes are evaluated. The first threshold indicates a value that is determined relative to the end-to-end latency of the path. The second threshold indicates a value that is determined relative to a maximum latency recorded in association with a previous node on the path, where the maximum latency can be updated as newly-determined latencies that satisfy the criteria are found to exceed the previous maximum. For instance, the first and second thresholds can be a proportion, percentage, etc. of the end-to-end latency and maximum latency, respectively. The performance analyzer evaluates the latency against the threshold corresponding to the hop count of the node for which the latency was determined. Latencies satisfy the criteria if the latencies do not exceed the respective threshold against which they are evaluated. Latency evaluation based on criteria determined from previously recorded latencies is described in further detail in reference to FIG. 7.

At block 615, the performance analyzer determines if the latency satisfies the criteria based on the evaluation. If the latency satisfies the criteria, operations continue at block 617, where the performance analyzer associates the latency value with the node IP address. The performance analyzer can associate the latency value with the entry of the data structure corresponding to the IP address of the node, add the latency value to another data structure storing latency values for the node, etc. Otherwise, operations continue at block 619.

At block 619, the performance analyzer indicates the latency for the node is to be disregarded. The performance analyzer may flag or otherwise associate an indicator with the latency to denote that the latency should not be considered during latency aggregation before adding the latency to the data structure indicating the node IP address. As another example, the performance analyzer may discard the latency and replace the latency with a placeholder value to indicate that the latency for the node was discarded (e.g., a null value).

At block 621, the performance analyzer increments the TTL value. Operations continue at block 603, where the performance analyzer sends a new packet(s) with the incremented TTL value in the TTL field to the destination IP address.

At block 623, the performance analyzer indicates the node IP addresses and the associated delay metric values. The performance analyzer may generate a report, notification, etc. or otherwise indicate the determined node IP addresses and their associated delay metric values. In other examples, rather than indicating the results after each pass in the form of a report or notification for viewing, the performance analyzer can indicate the node IP addresses and delay metric values for storage in a repository/database of delay metric values recorded for each node IP address across passes until the values are retrieved for metric value aggregation.

In some cases, the packet(s) sent at block 603 may be dropped in transit, or a response may not have been received within a time corresponding to the timeout threshold established for the node being targeted. In this case, the performance analyzer can send a duplicate packet targeting the node if a response has not yet been received within the time allotted by the respective threshold. The performance analyzer can repeat sending of packets targeting the node a configurable number of times after which the node should be marked as a timeout for the current pass. If a response (e.g., an ICMP time exceeded message) has not been received after the designated number of attempts for repeating a test, the performance analyzer can proceed to block 619 from block 603. If subsequent passes still fail to elicit a response from the node, the lack of response may be indicative of major performance issues, and the performance analyzer may indicate a possible outage or other issue is impacting the unresponsive node.

Figure 7:
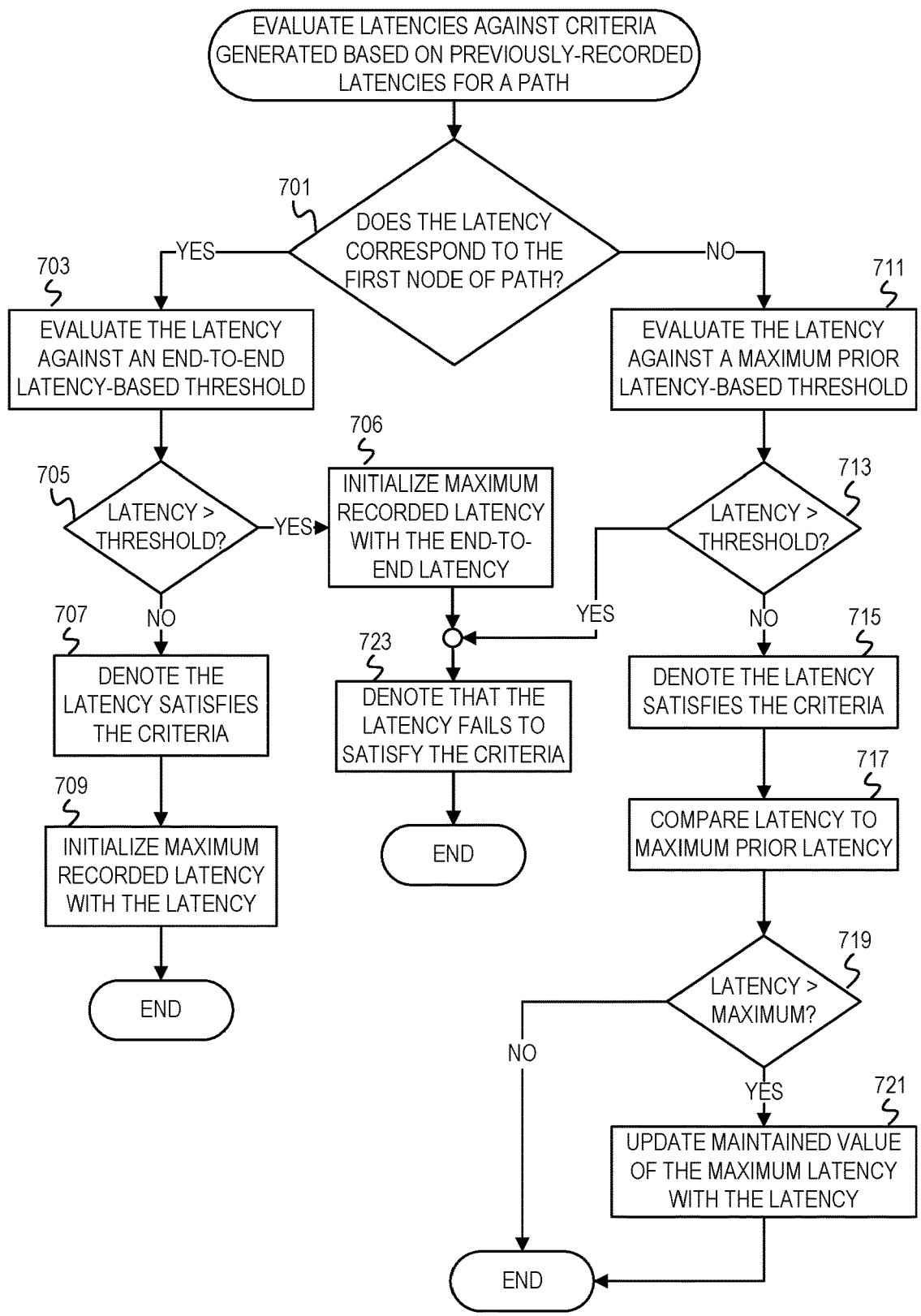
FIG. 7 is a flowchart of example operations for evaluating latencies against criteria generated based on previously-recorded latencies for a path.

FIG. 7 is a flowchart of example operations for evaluating latencies against criteria generated based on previously-recorded latencies for a path. The example operations are performed after a latency has already been determined for a node on the path and can implement the latency evaluation depicted as block 613 of FIG. 6. The example operations also assume that an end-to-end latency of the path has been determined.

At block 701, the performance analyzer determines if the latency corresponds to the first node of the path. The latency will correspond to the first node of the path, or the first hop, if it was determined based on receipt of a response(s) from a node after sending a packet(s) to the node with a TTL value of one. The performance analyzer can determine if the latency corresponds to the first node of the path based on the TTL value. If the latency corresponds to the first hop, operations continue at block 701. If the latency corresponds to a hop subsequent to the first hop, operations continue at block 711.

At block 703, the performance analyzer evaluates the latency against a threshold that is based on the end-to-end latency of the path. The threshold can be represented as a fraction, proportion, percentage, etc. of the end-to-end latency (e.g., 75% of the end-to-end latency). In some implementations, the threshold may be represented as a maximum of the fraction, proportion, percentage, etc. of the end-to-end latency and another value that is a configurable setting of or a parameter value provided to the performance analyzer. As an example, the performance analyzer may be represented as the maximum of 75% of the end-to-end latency and X, where X is any value in milliseconds (e.g., 100 milliseconds).

At block 705, the performance analyzer determines if the latency exceeds the threshold. If the latency was not determined to exceed the threshold as a result of the evaluation, operations continue at block 707. Otherwise, if the latency exceeds the threshold, operations continue at block 706.

At block 706, the performance analyzer initializes a maximum recorded latency recorded for nodes along the path, or a "maximum latency," with the end-to-end latency. The maximum latency is initialized with the end-to-end latency for subsequent comparison against latencies that satisfy their respective criteria since the latency of the first node did not satisfy the criteria. Operations continue at block 723.

At block 707, the performance analyzer denotes that the latency satisfies the criteria. The performance analyzer may return an indication that the latency satisfied the criteria to the calling routine/subroutine that invoked the program code (e.g., the routine/subroutine) implementing the latency evaluation, set a flag associated with the latency indicating that it satisfied the criteria, etc.

At block 709, the performance analyzer initializes the maximum recorded latency for nodes along the path with the latency value. The maximum latency is initialized with the latency of the first node since it satisfied the criteria. Subsequent latencies that satisfy their respective criteria will be evaluated against the maximum latency as testing is performed for following nodes of the path.

At block 711, the performance analyzer evaluates the latency against a threshold that is based on a maximum latency previously recorded for the path. The threshold can be represented as a fraction, proportion, percentage, etc. of the maximum latency (e.g., 150% of the end-to-end latency). In some implementations, the threshold may be represented as a maximum of the fraction, proportion, percentage, etc. of the maximum latency and the end-to-end latency. As an example, the performance analyzer may be represented as the maximum of the end-to-end latency and 150% of the maximum latency.

At block 713, the performance analyzer determines if the latency exceeds the threshold. If the latency was not determined to exceed the threshold as a result of the evaluation, operations continue at block 715. Otherwise, if the latency exceeds the threshold, operations continue at block 723.

At block 715, the performance analyzer denotes that the latency satisfies the criteria. The performance analyzer may return an indication that the latency satisfied the criteria to the calling routine/subroutine that invoked the program code (e.g., the routine/subroutine) implementing the latency evaluation, set a flag associated with the latency indicating that it satisfied the criteria, etc.

At block 717, the performance analyzer compares the latency value to the maximum latency previously recorded for the path. At block 719, the performance analyzer determines if the latency value recorded for the node is greater than the maximum latency based on the comparison. If the latency recorded for the current node is greater than the maximum latency, operations continue at block 721, where the performance analyzer updates the value of the maximum latency with the latency recorded for the node. Otherwise, the current value of the maximum latency is maintained, and operations are complete.

At block 723, if the latency was determined to exceed the threshold at either block 705 or block 713, the performance analyzer denotes that the latency fails to satisfy the criteria. The performance analyzer may return an indication that the latency did not satisfy the criteria to the calling routine/subroutine that invoked the program code (e.g., the routine/subroutine) implementing the latency evaluation, set a flag for the latency indicating that it failed to satisfy the criteria, etc. The latency will subsequently be regarded as a timeout for the node due to exceeding the corresponding threshold.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 5, the operations depicted in block 503 can be performed at least partially in parallel or concurrently across passes. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
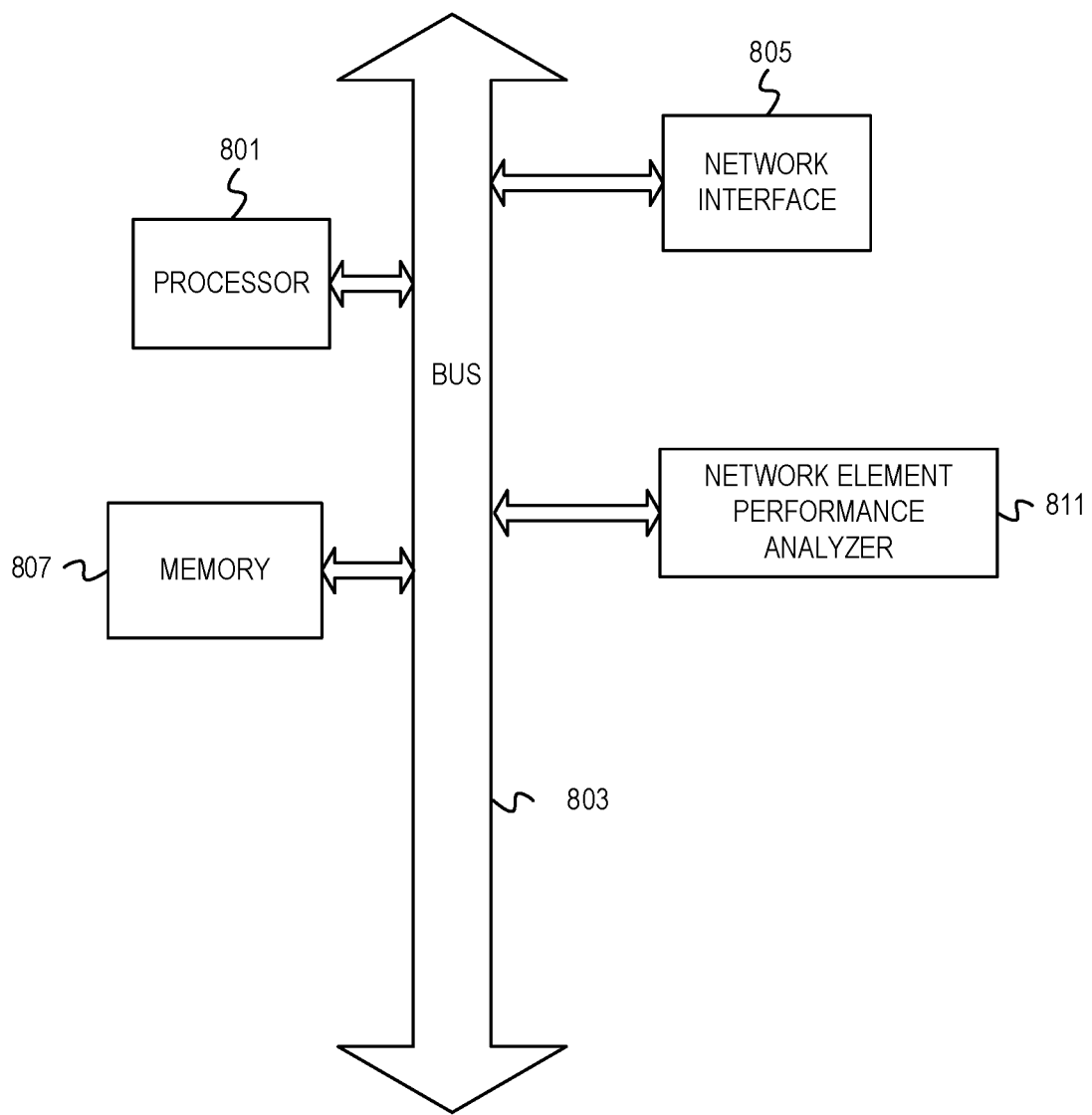
FIG. 8 depicts an example computer system with a network element performance analyzer.

FIG. 8 depicts an example computer system with a network element performance analyzer. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes network element performance analyzer 811. The network element performance analyzer 811 performs incremental testing of network elements along a path to determine pluralities of performance metric values for each network element and aggregates the pluralities of performance metric values associated with each node for identification of network elements potentially experiencing performance issues. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for enhanced identification of sources of delays in packet delivery along a path from a source IP address to a destination IP address as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    determining an end-to-end latency for a path from a source Internet Protocol (IP) address to a destination IP address;
    incrementally testing a plurality of network elements of the path, wherein incrementally testing the plurality of network elements comprises, for each network element of the plurality of network elements,
        determining an IP address and a plurality of latencies of the network element;
        based on the network element corresponding to a first hop on the path, evaluating the plurality of latencies against a first threshold, wherein the first threshold corresponds to a proportion of the end-to-end latency of the path; and
        based on the network element corresponding to a hop subsequent to the first hop, evaluating the plurality of latencies against a second threshold, wherein the second threshold corresponds to a proportion of a maximum latency recorded in association with another one of the plurality of network elements;
    for each network element of the plurality of network elements, aggregating those of the plurality of latencies determined for the network element that did not exceed the corresponding one of the first and second thresholds to generate an aggregate latency for the network element; and indicating the IP addresses of the plurality of network elements of the path and the aggregated latency corresponding to each of the plurality of network elements.

2. The method of claim 1, wherein evaluating the plurality of latencies against the corresponding one of the first and second thresholds comprises, for each network element of the plurality of network elements,
based on targeting the network element for testing, determining a latency of the network element; and
based on determining that the latency does not exceed the corresponding one of the first and second thresholds, record the latency in association with the IP address of the network element.

3. The method of claim 1 further comprising:
based on determining that the latency does not exceed the second threshold, comparing the latency with the maximum latency; and
updating the maximum latency with the latency based on determining that the latency is greater than the maximum latency.

4. The method of claim 1 further comprising, for each of the plurality of network elements, determining at least one of jitter for the network element based on the plurality of latencies determined for the network element and packet loss based on counts of messages transmitted to the network element and responses received from the network element.

5. The method of claim 1, wherein incrementally testing the plurality of network elements comprises, for each network element of the plurality of network elements, sending a plurality of messages destined for the destination IP address that indicate a time to live (TTL) value corresponding to a hop count of the network element and, for each of the plurality of messages, recording a time between sending the message and receiving a response from the network element.

6. The method of claim 5, wherein each of the plurality of messages is a Transmission Control Protocol synchronize (TCP SYN) message, wherein the response to each of the plurality of messages is an Internet Control Message Protocol (ICMP) time exceeded message indicating an IP address of the network element, and wherein determining the IP address of the network element comprises determining the IP address from the response.

7. The method of claim 5, wherein the plurality of latencies corresponds to the plurality of messages for which a response was received.

8. One or more non-transitory machine-readable media having program code stored thereon, the program code comprising instructions to:
determine an end-to-end latency for a path from a source Internet Protocol (IP) address to a destination IP address;
perform incremental tests targeting each of a plurality of nodes of the path, wherein the instructions to perform the incremental tests comprise instructions to, for each node of the plurality of nodes,
determine an IP address and a plurality of latencies of the node;
determine a value of a threshold based on a hop count of the node, wherein the value of the threshold corresponds to a proportion of the end-to-end latency of the path if the hop count of the node for the path is one and corresponds to a proportion of a maximum latency previously determined for another one of the plurality of nodes if the hop count of the node for the path that is greater than one; and
determine whether each of the plurality of latencies satisfies the threshold;
generate aggregate latencies for each of the plurality of nodes based on aggregation of those of the plurality of latencies determined for each of the plurality of nodes that did not exceed the threshold; and
indicate the IP addresses of the plurality of nodes of the path and corresponding ones of the aggregated latencies.

9. The non-transitory machine-readable media of claim 8, wherein the instructions to perform the incremental tests comprise instructions to,
for each node of the plurality of nodes, send a plurality of messages destined for the destination IP address that indicate a time to live (TTL) value corresponding to a hop count of the node; and
for each of the plurality of messages, record a time between sending of the message and receipt of a response from the node.

10. The non-transitory machine-readable media of claim 8, wherein the instructions to determine the plurality of latencies and whether each of the plurality of latencies satisfies the threshold comprise instructions to, for each of the plurality of nodes,
based on performance of one of the incremental tests, determining a latency of the node;
determine whether the latency exceeds the threshold based on evaluation of the latency against the threshold; and
based on a determination that the latency does not exceed the threshold, record the latency in association with the IP address of the node.

11. The non-transitory machine-readable media of claim 8, wherein the program code further comprises instructions to determine at least one of jitter and packet loss for each of the plurality of nodes based on results of the incremental tests.

12. The non-transitory machine-readable media of claim 8, wherein the program code further comprises instructions to:
for each of the plurality of latencies, based on a determination that the latency does not exceed the second threshold, compare the latency with the maximum latency; and
update the maximum latency with the latency based on a determination that the latency is greater than the maximum latency.

13. The non-transitory machine-readable media of claim 9, each of the plurality of messages is a Transmission Control Protocol synchronize (TCP SYN) message, wherein the response to each of the plurality of messages is an Internet Control Message Protocol (ICMP) time exceeded message indicating an IP address of the node, wherein the instructions to determine the IP address of the node comprise instructions to determine the IP address of the node from the response.

14. An apparatus comprising:
a processor; and
a computer-readable medium having instructions stored thereon that are executable by the processor to cause the apparatus to,
determine an end-to-end latency for a path from a source Internet Protocol (IP) address to a destination IP address, wherein the path comprises a plurality of network elements;
incrementally test the plurality of network elements, wherein incremental testing of the plurality of network elements comprises testing to determine IP addresses of the plurality of network elements and, for each network element of the plurality of network elements, a plurality of latencies;

for each network element of the plurality of network elements and corresponding plurality of latencies, determine if each of the plurality of latencies exceeds a determined one of a plurality of thresholds, wherein the instructions to determine if each of the plurality of latencies exceeds the determined one of the plurality of thresholds comprise instructions to, based on a determination that a hop count of the network element on the path is one, evaluate the latency against a first of the plurality of thresholds, wherein the first threshold corresponds to a proportion of the end-to-end latency; and based on a determination that the hop count of the network element is greater than one, evaluate the latency against a second of the plurality of thresholds, wherein the second threshold corresponds to a proportion of a maximum latency recorded previously for another one of the plurality of network elements;

for each of the plurality of network elements, aggregate at least a subset of the plurality of latencies that did not exceed the determined one of the plurality of thresholds into an aggregate latency; and indicate the IP addresses of the plurality of network elements of the path and the aggregate latency for each of the plurality of network elements.

15. The apparatus of claim 14, wherein the instructions executable by the processor to cause the apparatus to determine if each of the plurality of latencies exceed the determined one of the plurality of thresholds comprise instructions executable by the processor to cause the apparatus to, for each latency of the plurality of latencies corresponding to one of the plurality of network elements, determine the latency and an IP address of the network element based on performance of a test targeting the network element;

determine if the latency satisfies the determined one of the plurality of thresholds based on evaluation of the latency against the threshold; and based on a determination that the latency does not exceed the determined one of the plurality of thresholds, record the latency in association with the IP address of the network element.

16. The apparatus of claim 14, wherein the instructions executable by the processor to cause the apparatus to aggregate the subset of the plurality of latencies into an aggregate latency for each of the plurality of network elements comprise instructions executable by the processor to cause the apparatus to, for each of the plurality of network elements, average the subset of the plurality of latencies recorded for the network element, and wherein the instructions further comprise instructions executable by the processor to cause the apparatus to determine at least one of jitter and packet loss for each of the plurality of network elements based on results of the incremental testing.

17. The apparatus of claim 14, wherein the instructions executable by the processor to cause the apparatus to incrementally test the plurality of network elements comprise instructions executable by the processor to cause the apparatus to, for each of the plurality of network elements, send a plurality of messages indicating the destination IP address and a time to live (TTL) value corresponding to a hop count of the network element; and record a time between sending each of the plurality of messages and receiving a response to each message from the network element.

18. The apparatus of claim 17, wherein the instructions executable by the processor to cause the apparatus to send the plurality of messages comprise instructions executable by the processor to cause the apparatus to send a plurality of Transmission Control Protocol synchronize (TCP SYN) messages, and wherein the instructions executable by the processor to cause the apparatus to determine the IP addresses of the plurality of network elements comprise instructions executable by the processor to cause the apparatus to, for each of the plurality of network elements, determine an IP address of the network element based on the response to each of the plurality of messages.

19. The apparatus of claim 15, further comprising instructions executable by the processor to cause the apparatus to:

based on a determination that the latency does not exceed the second threshold, compare the latency with the maximum latency; and update the maximum latency with the latency based on a determination that the latency is greater than the maximum latency.

20. The apparatus of claim 18, wherein the response to each of the plurality of messages is an Internet Control Message Protocol (ICMP) time exceeded message indicating the IP address of the network element.

* * * * *